United States Patent [19]
Ghaibeh

[11] Patent Number: 5,956,338
[45] Date of Patent: Sep. 21, 1999

[54] PROTOCOL FOR BROADBAND DATA COMMUNICATION OVER A SHARED MEDIUM

[75] Inventor: Gihad Ghaibeh, Redwood City, Calif.

[73] Assignee: Ericsson, Inc., Menlo Park, Calif.

[21] Appl. No.: 08/677,160

[22] Filed: Jul. 9, 1996

[51] Int. Cl.[6] .................................................. H04J 15/00
[52] U.S. Cl. ...................... 370/395; 370/431; 370/462
[58] Field of Search ................................. 370/395, 431, 370/449, 462, 485–87; 340/825.08; 395/200.55

[56] References Cited

U.S. PATENT DOCUMENTS

| | | | |
|---|---|---|---|
| 5,142,532 | 8/1992 | Adams | 370/432 |
| 5,185,737 | 2/1993 | Nassehi et al. | 370/449 |
| 5,317,571 | 5/1994 | Marcel et al. | 370/103 |
| 5,355,368 | 10/1994 | Dore et al. | 370/95.3 |
| 5,425,027 | 6/1995 | Baran | 370/395 |
| 5,426,636 | 6/1995 | Hiller et al. | 370/60 |
| 5,557,612 | 9/1996 | Bingham | 370/449 |

OTHER PUBLICATIONS

C. Sierens et al.: "A First Description of the Hybrid Fiber Coax Concept in the Framework of the Acts Project ATHOC" IEE Colloquium on Optical and Hybrid Access Networks, Mar. 4–5, 1996, IPSWICH GB, pp. 18/1–18/5, XP002050372 see paragraph 3.

V. Vande Keere et al.: "Rapid Prototyping of a CATV Network Termination for ATM–Based Video–on–Demand Services" 7th IEEE International Workshop on Rapid System Prototyping, Jul. 19–21, 1996, Thessaloniki GR, pp. 44–49, XP002050373 see par. 3.2 –para 4.4.

J.E. Dail et al.: "Adaptive Digital Access Protocol: A Mac Protocol for Multiservice Broadband Access Networks" IEEE Communications Magazine, vol. 34, No. 3, Mar. 1996 N.Y.US, pp. 104–112, XP000557382.

Bisdikian, C: "MLAP: A MAC Level Access Protocol for the HFC 802.14 Network" IEEE Communications Magazine, vol. 34, No. 3, Mar. 1, 1996, pp. 114–121, XP000557383.

*Access to B–ISDN Via PONS: ATM Communication in Practice,* edited by Ulrich Killat, pub. by Wiley and Tuebner, 1996, pp. I–XX, 1–308.

*Primary Examiner*—Lance Leonard Barry, Esq.
*Attorney, Agent, or Firm*—Lyon & Lyon LLP

[57] ABSTRACT

Network architectures and data communication protocols for supporting both downstream and upstream transport of digital data between a headend facility and multiple downstream network terminals over a shared communication medium include downstream framing protocols compatible with DVB modem transmission framing synchronization and FEC standards at the physical layer, which support a full range of 16 to 256 QAM transmission rates in both 6 MHz and 8 MHz channels. The downstream data frames are formed by one or more repeating pairs of DVB compatible frame slots, wherein each downstream frame is transmitted over the same interval, e.g., 250 usec in preferred formats, regardless of the number of DVB slot pairs it contains. All downstream frame rates are supported by a single upstream data rate. Upstream bandwidth is allocated based on a selected set of operating criteria and service type priorities, based on both a polling basis and a contention basis, on one or more in-band RF subcarrier channels.

19 Claims, 14 Drawing Sheets

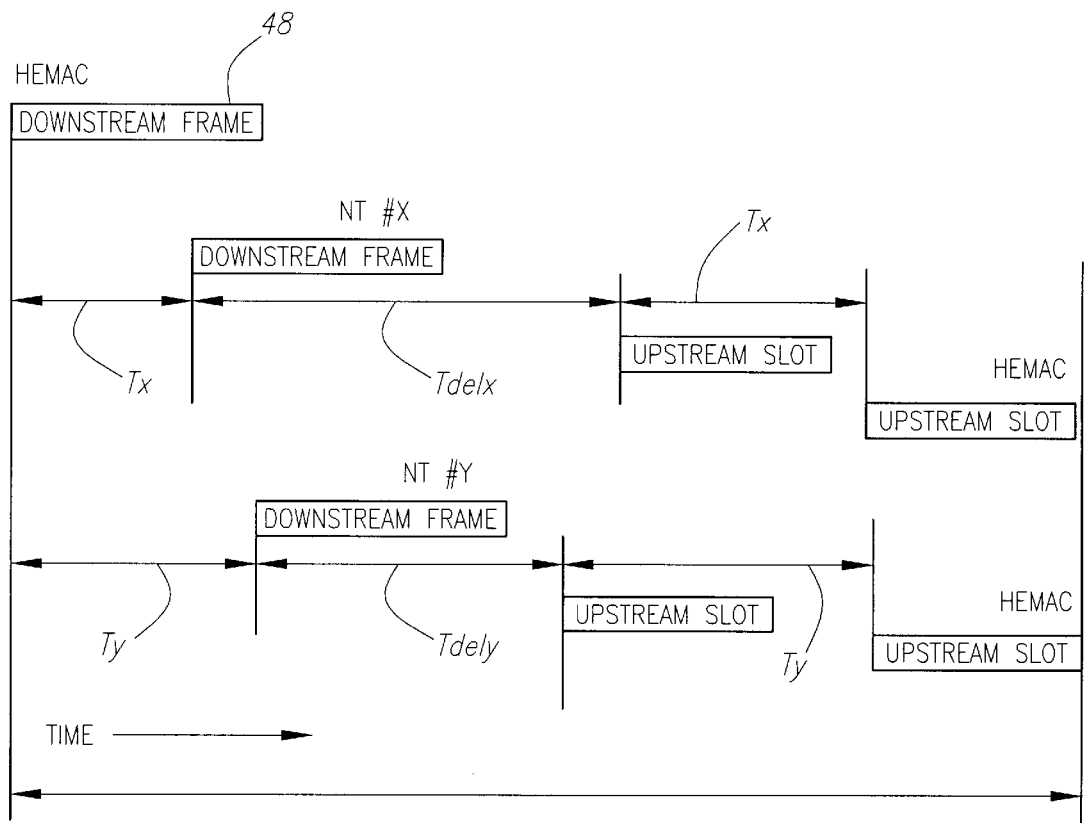

PROTOCOL FOR BROADBAND DATA COMMUNICATION OVER A SHARED MEDIUM

FIELD OF THE INVENTION

The present invention pertains to the field of communication networks, including data transmission protocols for the transport of digital data over a shared broadband communication medium.

BACKGROUND OF THE INVENTION

In most modern telecommunication networks, a community of subscribers are connected to a central office switch through a "two-way" distribution network, which may include one or more transmission facilities, e.g., microwave, optical, electrical, etc., and which may utilize both analog and digital baseband transmission protocols. By way of example, subscribers associated with a respective central office switch may be connected to the switch via a series of remotely located network units, with each network unit serving subscribers in a defined local area. Between the central office switch and each network unit, telecommunication signals are commonly digitized and multiplexed for transport over relatively high bandwidth facilities for greater network efficiency. More recently, digital transmission of telecommunication signals may span all the way between a central office switch and a digital network termination point at a subscriber premise location.

In addition to basic analog or digital telephony, other types of services may also be provided over a traditional telecommunication network. For example, it is well known to use a digital/analog "modem" (modulator/demodulator) for transporting digital data over a telecommunication network via (relatively low frequency) analog modulation. Analog carrier also generally the transport mode of choice in many high bandwidth networks, such as video broadcast networks. For example, in a typical cable television ("CATV") broadcast network, a broadcast communication signal is transmitted "downstream" from a headend broadcast facility to a community of subscribers over a coaxial cable distribution network via RF carrier channels covering a wide (relatively high) frequency bandwidth—e.g., between 50 and 800 MHz.

In addition to the one-way, downstream distribution of the video broadcast signals, it is desirable in a CATV broadcast distribution network to be able to transmit and receive—i.e., in both the downstream and "upstream" directions,— information such as, e.g., network operations, administration and maintenance ("OAM") data, or "set-top" data. As used herein, "set-top" data refers generally to information transmitted to or from CATV control circuitry, which is traditionally located in a box-like unit placed on top of a subscriber's television set, hence the "set-top" designation, although more recently the control circuitry is incorporated within the television set itself. Downstream set-top data may include, for example, an instruction sent from the CATV service provider to activate or deactivate subscriber CATV service, or to authorize additional channel reception within the RF channel spectrum of the broadcast signal. Another example of downstream set-top data may include "polling" information to collect data on usage, e.g., for ratings or billing purposes. Upstream data sent from the subscriber set-top circuitry to the service provider, sometimes referred to as "set-top telemetry" data, may include a response to downstream polling, or a video-on-demand subscriber service request.

It is presently anticipated that several new services will arise requiring both point-to-point and point-to-multipoint transmission of independent communication signals, including a full range of digital baseband services. Thus, in addition to the desirability of combining traditional (synchronous) telecommunication and CATV services over a single distribution network, it is also desirable for such a network to fully support the two-way transport of multiple "broadband" data services, such as asynchronous transfer mode ("ATM") data packets, or "cells," Generally, ATM cells contain information relating to one or more communication signals, which are periodically assembled and transmitted from a sending node and received and disassembled at a receiving node. ATM transmission is particularly advantageous in that it enables the transport of multiple services over a single communication path, wherein bandwidth utilization may be optimized as a function of the statistical activity of each individual service—i.e., wherein the services are "bursty" in nature, so that bandwidth is efficiently shared. Other types of bursty data traffic include local area network ("LAN") traffic, which is traditionally limited to private, or closed-loop networks, but is more frequently being carried over shared public access (e.g., telecommunication) networks for greater efficiency in connecting multiple LAN locations. Further, with the explosion of recent interest in services associated with the "Internet", demand for low cost, high speed two-way digital data transport is at an all time high.

Given the wide variety of potential broadband communication services to be supported over a single, shared communication network, it is desirable to provide an efficient digital data transmission protocol for both downstream and upstream communication paths. Such a data transmission protocol should preferably be compatible with existing modem transmission standards, such as DAVIC and DVB standards, and should most fully utilize the available carrier channel bandwidth. The use of a coaxial distribution network to support a broadband data services network is desirable in that it is cost effective to use existing embedded plant, e.g., an existing CATV distribution network. Further, coaxial cable provides a relatively inexpensive mode for transporting high frequency communication signals, e.g., as opposed to twisted copper pair. However, because of the physical attributes of known coaxial distribution networks, transport capacity problems may arise due to transient noise, etc. Further, broadband data services being provided in addition to CATV broadcast and two-way telecommunication signals will have to contend for limited availability of bandwidth channels.

Thus, it is desirable to provide a data communication protocol that will dynamically and adaptively allocate limited network bandwidth to a number of communication nodes sharing a common communication medium, such as a relatively "noisy" coaxial distribution network, while simultaneously supporting multiple types of data traffic, including bursty data such as ATM or LAN traffic, as well as synchronous data such as continuous bit rate ("CBR") telephony traffic.

SUMMARY OF THE INVENTION

The present invention provides network architectures and data communication protocols for supporting both downstream and upstream transport of digital data between a headend facility and multiple downstream network terminals ("NTs") over a shared communication medium.

In a preferred embodiment, the headend facility includes a central ("master") HeadEnd Media Access Control unit ("HEMAC"), which communicates with respective ("slave") Media Access Control ("MAC") units located in each NT. Digital data is presented to the HEMAC and respective NT MAC units via dedicated service interfaces, such as, e.g., CBR telephony, ATM, or LAN data interfaces at each location.

Between the HEMAC and the respective NT MAC units, "downstream" data (i.e., from the headend to the NTs) is transmitted in continuous serial data frames over a common RF subcarrier frequency, i.e., wherein all downstream data frames are received by all NTs associated with the respective downstream RF subcarrier channel. The NTs evaluate each downstream data frame, e.g., based on source, destination or broadcast address fields, to determine whether it is an intended recipient of data contained therein. "Upstream" data (i.e., from an NT to the headend) is transmitted in individual data frames from respective individual NTs in TDMA slots on a shared upstream RF subcarrier channel that is separate from the downstream subcarrier channel.

The downstream data frames are preferably compatible with DVB modem transmission framing synchronization and forward error correction ("FEC") standards at the physical layer, and support a full range of 16 to 256 quadrature amplitude modulation ("QAM") transmission rates in both 6 MHz and 8 MHz channels. Preferably, selected downstream transmission rates are in multiples of 8 Khz (i.e. 125 use) to accommodate basic rate synchronized telephony traffic rates. For example, in preferred embodiments, downstream frames are formed by one or more repeating pairs of DVB compatible frame slots ("DVB slots"), wherein each downstream frame is transmitted over a 250 use interval, regardless of the number of DVB slot pairs it contains.

All downstream frame rates are preferably supported by a single upstream data rate. In particular, upstream frame transmission timing is identical to the downstream frame transmission timing—, i.e., each upstream frame is also transmitted over a 250 use interval in preferred embodiments, regardless of its payload size. An individually calculated upstream transmission delay is preferably imposed at each NT so that the upstream frames are received serially at the headend facility at the same interval timing as the downstream frames are being transmitted.

The HEMAC preferably allocates upstream bandwidth to respective NTs based on a selected set of operating criteria and service type priorities. In addition to a data "payload", each downstream data frame includes an upstream bandwidth "permit", which, depending on the type of permit issued in a given downstream frame, allows for a respective NT to transmit a "request" in a corresponding upstream data frame. Generally, permits are issued by the HEMAC on both a "polling" basis, i.e., wherein a permit is targeted to a specific NT, as well as a "contention" basis, i.e., wherein any NT may vie for an available upstream request slot. In preferred embodiments, permits are also issued based on specific types of upstream data to be transmitted, e.g., ATM or CBR permits, wherein priority may be given to certain low-delay services, such as telephony traffic. Permit types may also include "sign-on" permits for allowing newly activated NTs to make their presence known to the headend facility, or "ranging" permits for allowing the HEMAC to determine, and adjust for, respectively, transmission delays of a respective NT.

Because upstream frame transmission is provided in TDMA frames corresponding on a one-to-one basis with downstream frames, only one permit may be provided in each respective downstream frame per upstream subcarrier channel. Upstream network capacity may be expanded in alternate preferred embodiments by providing one or more additional upstream RF subcarrier channels, wherein respective groups of NTs simultaneously transmit upstream on separate subcarrier channels in response to separate permits issued by the HEMAC in the same downstream frame.

Thus, a general object of the present invention is to provide a data transmission protocol which allows the HEMAC to control both CBR and ATM data transport between the headend facility and respective NTs by providing real-time allocation of the various permit types, depending upon actual demand.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which:

FIG. 16 is a timing diagram illustrating a preferred network terminal transmission delay protocol; and FIG. 17 is a functional diagram of a preferred permit scheduler table in a headend MAC controller.

DETAILED DESCRIPTION OF THE PREFERRED EMBODIMENTS

Figure 1:
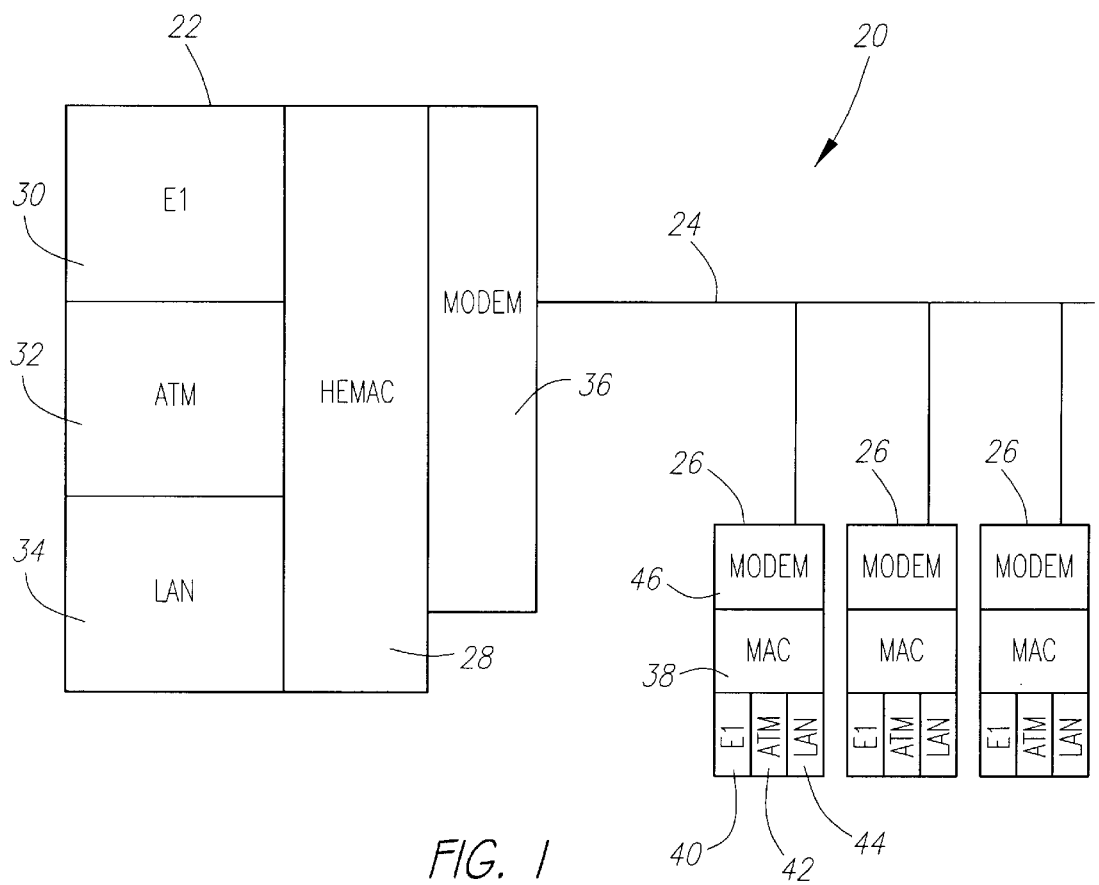
FIG. 1 is a block diagram of an exemplary broadband communication network employing a coaxial distribution network for transmitting data between a headend facility and multiple network terminals.

Referring to FIG. 1, a broadband communication network 20 includes a headend facility 22, which transmits and receives digital data over a coaxial distribution network 24 to and from, respectively, multiple network terminal nodes (NTs) 26. The headend facility 22 includes a HeadEnd Media Access Controller (HEMAC) 28, which controls the transport of various digital data streams between the headend facility 22 and the respective NTs 26. In preferred embodiments, digital data services supported by broadband communication network 20 may include both synchronous continuous bit rate (CBR) services, such as telephony, and asynchronous transfer mode (ATM) services, such as packet data. For example, in the preferred embodiment illustrated in FIG. 1, the headend 22 facility is equipped with an El (CBR) telephony interface 30, an ATM packet interface 32 and a LAN data interface 34, which individually transmit and receive digital data to and from, respectively, the HEMAC 28.

The headend facility 22 is also equipped with a modem 36 for RF carrier modulating downstream data signals over the coaxial distribution network 24 on a selected RF subcarrier channel to all NTs 26 associated with that channel. The modem 36 also demodulates RF carrier modulated upstream data stream received from respective NTs 26 on one or more common upstream RF subcarrier channels that are separate from the respective downstream data channel. In preferred embodiments, the coaxial distribution network 24 is limited to network "trees" having no more than three amplifiers (not shown) along any one route, i.e., from the headend facility 22 to a given NT 26, in order to limit the impact of transient noise and distortion on the respective downstream and upstream communication signals.

Each NT 26 is equipped with its own Media Access Controller (NT MAC) 38 for handling various digital data streams transmitted between the respective NT 26 and the headend facility 22. Depending on a selected network configuration, each NT 26 preferably supports one or more of the digital data services handled by the headend facility 22. For example, in the preferred embodiment illustrated in FIG. 1, each NT 26 is equipped with an El (CBR) telephony interface 40, an ATM packet interface 42 and a LAN data interface 44, respectively, which individually transmit and receive data to and from the respective NT's MAC 38. There is no requirement, however, that any given NT 26 be equipped to handle any of the particular data services supported by the headend facility 22.

Each NT 26 is equipped with its own modem 46, which demodulates downstream data signals received from the headend 22 for processing by the NT's MAC 38. The NT modem 46 also modulates respective upstream data signals for upstream transmission to the head end 22 over the coaxial distribution network 24 on a different respective RF subcarrier channel.

Figure 2:
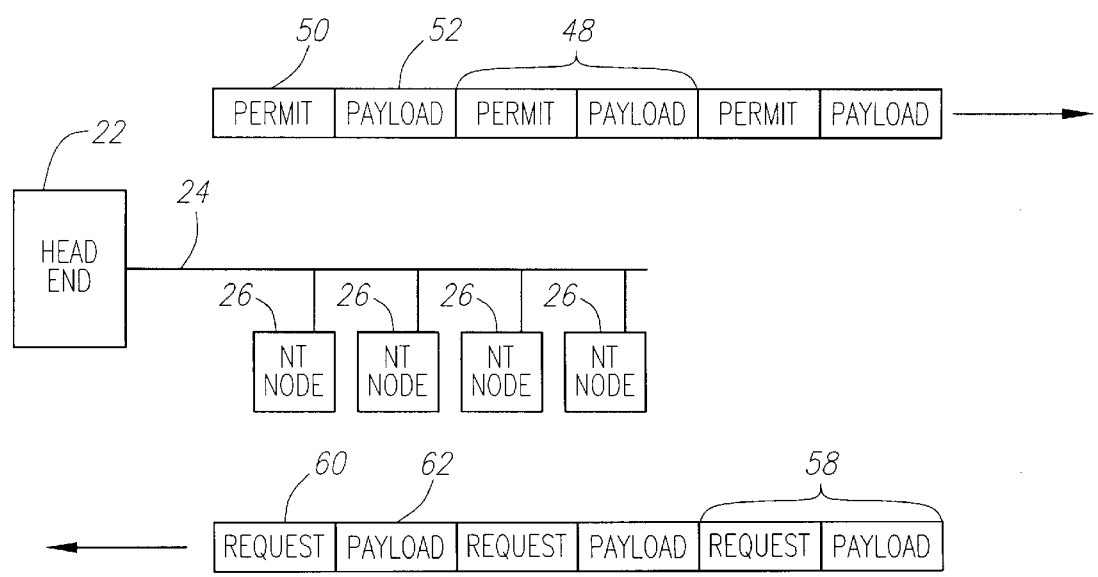
FIG. 2 is a block diagram depicting the respective downstream and upstream transmission of digital data frames in the communication network of FIG. 1.

Referring to FIG. 2, downstream data is transmitted from the headend 22 in continuous (serial) downstream data frames 48. In order to dynamically assign upstream transmission bandwidth, the HEMAC 28 issues an upstream bandwidth "permit" 50 in each downstream frame 48, on a "one permit per upstream subcarrier channel" basis. As described in greater detail in conjunction with FIGS. 5–8, the permits 50 are carried in an overhead section of each downstream frame 48. In accordance with a general aspect of the inventions set forth herein, upstream bandwidth permits are allocated by the HEMAC 28 on an open "contention" mode, a reservation "polling" mode, or, for certain low-delay services, a "scheduled" mode.

Contention mode permits are available to any NTs 26 needing to transmit upstream data to the headend 22,—i.e., the NTs may "contend" for the available upstream slot. Contention mode permits are especially advantageous in networks containing a relatively large number of NTs 26, wherein a "polling only" protocol would take too long in finding NTs 26 requesting upstream bandwidth, as well as waste bandwidth in the process by polling uninterested NTs 26. However, because contention mode permits allow for collisions between responding NTs 26, they are far more effective in light network traffic conditions than in heavy network traffic conditions.

On the other hand, reservation mode permits are "collisionless," in that they reserve a block of upstream bandwidth (i.e., a number of upstream cells or slots) exclusively for specifically targeted NT 26, e.g., on a predetermined polling basis. Reservation mode permits are advantageous in heavy network traffic conditions, in that they insure that all NTs 26 have at least some opportunity to request upstream bandwidth.

Both contention mode and reservation mode permits allow a NT 26 to request additional upstream bandwidth, e.g., in the form of further reservation mode permits or a fixed series of scheduled mode permits. In particular, schedule mode permits assign a fixed amount of bandwidth to a given NT 26, e.g., consisting of evenly spaced upstream cells or time slots, and is intended primarily to deliver synchronous services such as low-delay CBR telephony traffic.

Each NT 26 associated with the respective downstream subcarrier channel receives and evaluates each downstream frame 48 to determine whether it is an intended recipient of either an enclosed permit 50, or of downstream payload data 52 contained therein. An NT 26 may thereafter respond to a permit 50 contained in a downstream frame 48 by attaching an upstream ATM "payload" cell 62 to a header containing a "request" 60 and transmits it upstream to the HEMAC 28 in an upstream data frame 58. Although upstream frames 58 may differ significantly in bit-size and, thus, data rate from the downstream frames 48, they are still transmitted and received, respectively, at the same interval timing. In preferred embodiments, varying upstream transmission distances are compensated for by imposing a transmission delay period at each respective NT 26, i.e., depending on its respective distance from the headend 22, so that the upstream frames 58 arrive in successive intervals corresponding to the respective downstream frame transmission intervals.

Figure 3:
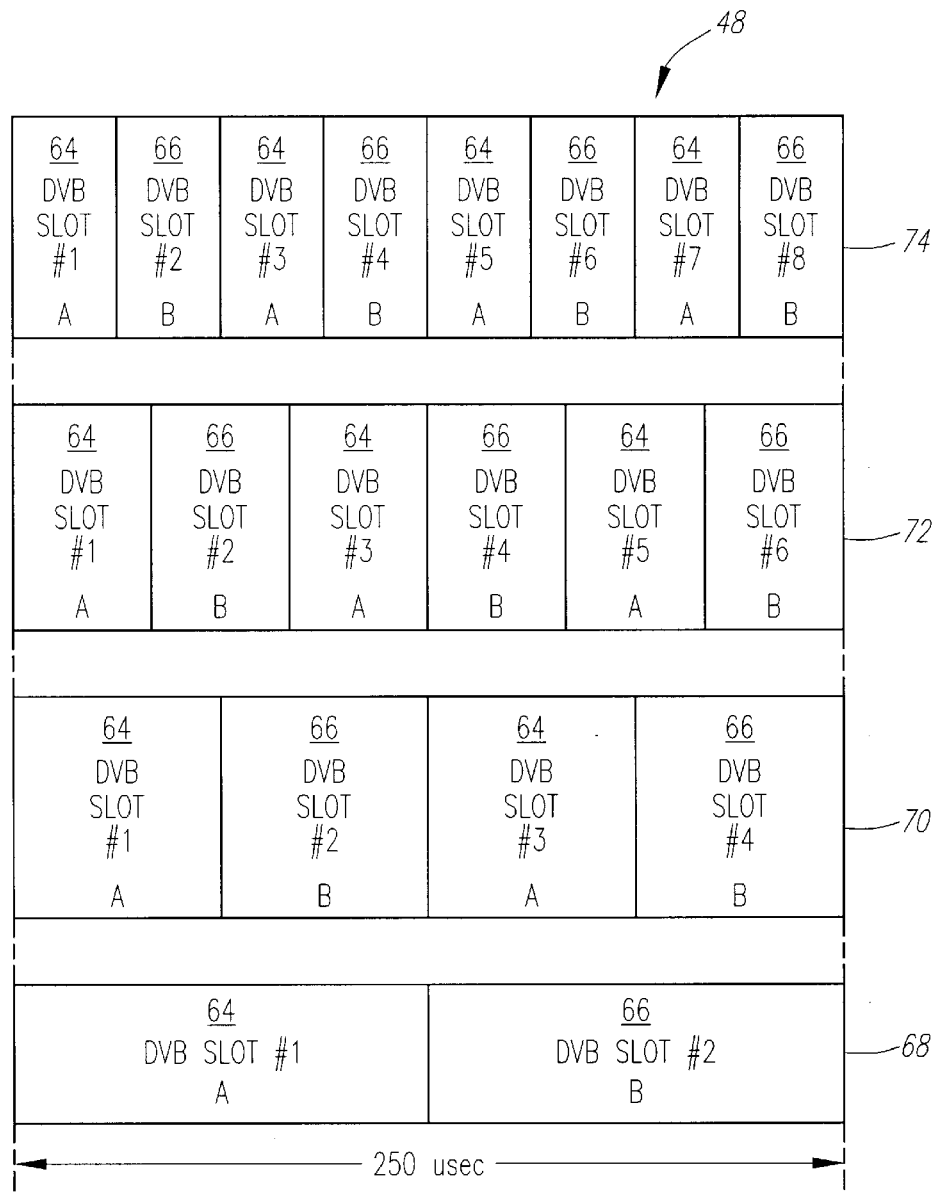
FIG. 3 is a block diagram of preferred downstream data frame formats employing alternate DVB framing slot configurations.

Referring to FIG. 3, the downstream data frames 48 are preferably configured to be compatible with existing DVB modem transmission framing and forward error correction ("FEC") standards at the physical layer. In accordance with another general aspect of the inventions set forth herein, preferred downstream data frames 48 are formed by even pairs of DVB compatible frame slots ("DVB slots"), designated as "A" and "B", respectively, wherein each successive downstream data frame 48 is transmitted from the headend 22 in a 250 use interval, regardless of the number of DVB slot pairs it contains. Exemplary preferred downstream frame configurations are depicted in FIG. 3, including a first frame 68 comprising a single DVB slot pair (i.e., with two total DVB slots), a second frame 70 comprising a double DVB slot pair (i.e., with four total DVB slots), a third frame 72 comprising a triple DVB slot pair (i.e., with six total DVB slots), and a fourth frame 74 comprising a quadruple DVB slot pair (i.e., with eight total DVB slots), respectively, wherein each respective DVB slot pair "A–B" in each the frame configurations 68, 70, 72 and 74 pair, are identical.

Figure 4:
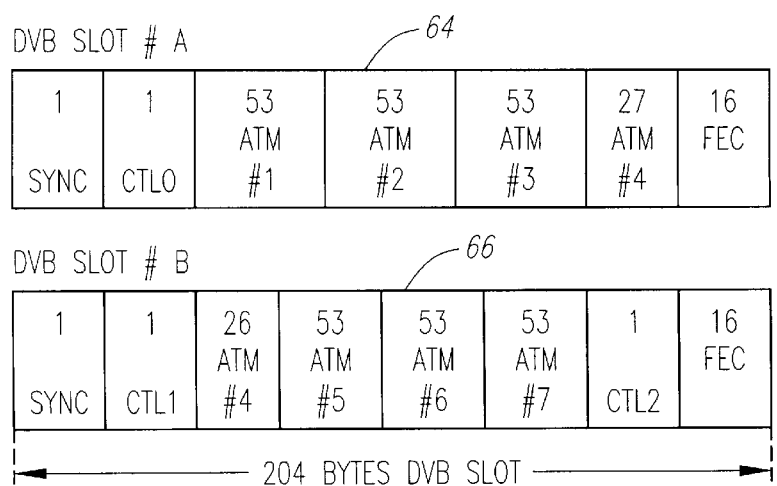
FIG. 4 is a block diagram of a preferred DVB framing slot pair for use in the preferred downstream data frame formats of FIG. 3.

In conformance with DVB modem frame transmission standards, DVB slots A and B each comprise two hundred and four data bytes, wherein the respective A-B slot pairs are transmitted serially by the headend 22, i.e., from left to right, as illustrated in FIG. 4. In particular, DVB slot "A"(64) of each A–B pair is formed by an initial synchronization ("sync") byte, which is followed by a first control byte ("CTL0"), three successive fifty-three byte ATM cells (#s 1–3), the first twenty-seven bytes of a fourth ATM cell (#4), and sixteen bytes of FEC information, respectively. DVB slot "B"(66) also begins with a synch byte, which is followed by a second control byte (CTL1), the remaining twenty-six bytes of ATM cell (#4), three additional fifty-three byte ATM cells (#s 5–7), a third control byte (CTL2), and sixteen bytes FEC information, respectively.

Thus, as can be calculated from the respective DVB slot configurations, and based on the preferred downstream frame transmission timing of 250 use, the two DVB slot downstream frame 68 provides a data transmission rate of 13.056 megabits per second ("Mbps"), which is compatible for DVB modem transmission at 16 QAM in a 6 MHz channel; the four DVB slot downstream frame 70 provides a transmission rate of 26.112 Mbps, which is compatible for DVB modem transmission at either 64 QAM in a 6 MHz channel or at 16 QAM in a 8 MHz channel; the six DVB slot downstream frame 72 provides a transmission rate of 39.168 Mbps, which is compatible for modem transmission at either 256 QAM in a 6 MHz channel or at 64 QAM in an 8 MHz channel; and the eight DVB slot downstream frame format 74 provides a transmission rate of 52.224 Mbps, which is compatible for modem transmission at 256 QAM in an 8 MHz channel, respectively.

In preferred embodiments, a sixty-eight byte upstream data frame 58 is employed, which provides an upstream data rate of 2.176 Mbps, based on the preferred 250 use upstream transmission interval. This upstream data frame length is advantageously evenly divisible into any of the aforementioned exemplary preferred downstream frame format rates—e.g., at a 6:1 ratio with respect to the two DVB slot downstream frame 68; at a 12:1 ratio with respect to the four DVB slot frame 70; at an 18:1 ratio with respect to the six DVB slot frame 72; and at a 24:1 ratio with respect to the eight DVB slot frame 74, respectively. Various preferred upstream frame configurations are described in greater detail in conjunction with FIGS. 9–15.

Figure 5:
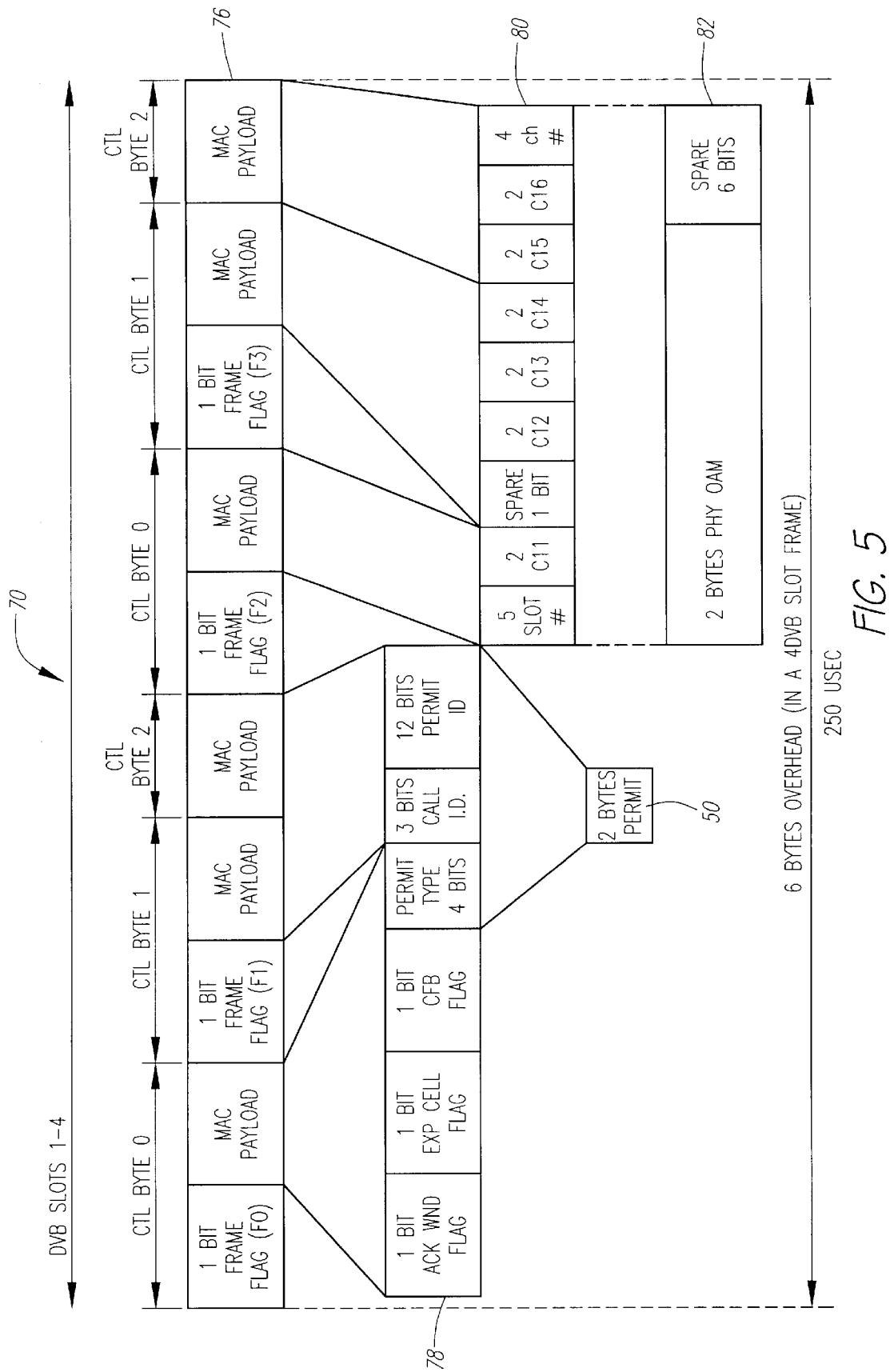
FIG. 5 is a block diagram of a preferred MAC control byte allocation in a four DVB framing slot downstream data frame.

Referring to FIG. 5, a four DVB slot downstream frame 70 is depicted with the respective sync, ATM cell and FEC bytes omitted for purposes of illustrating a preferred control byte configuration. In accordance with yet another general aspect of the inventions set forth herein, the respective control bytes retain their DVB position, but their content has been altered for purposes of upstream bandwidth allocation by the HEMAC 28. In particular, control bytes CTLO–2 of the first DVB slot pair (i.e., DVB slots "one" and "two") are serially aligned with the respective control bytes CTL0–2 of the second DVB slot pair (i.e., DVB slots "three" and "four") to form a six byte "control" subframe 76. The control subframe 76 is used to carry MAC overhead from the HEMAC 28 to the respective NT MACs 38, including respective upstream transmission permits 50 and the necessary overhead information required by the HEMAC 28 in order to assign upstream bandwidth to respective NTs 26.

With respect to the first DVB slot pair of the control subframe 76, control byte CTL0 includes a first (one bit) frame flag, F0, and seven bits "MAC payload" data; control byte CTL1 includes a second (one bit) frame flag, F1, a seven bits MAC payload data; and control byte CTL2 includes eight bits MAC payload data, respectively. The collective twenty-two bits of the MAC payload data 78 contain a four bit "permit type" field, a three bit "call ID" field and a twelve bit "permit ID" field, respectively, wherein the respective permit type and ID fields collectively form a nineteen bit permit 50. The MAC payload data 78 of the first DVB slot pair also includes three "acknowledge" flag bits: a first flag to mark the beginning of the field window; a second flag indicating whether an ATM expansion channel is being transmitted (discussed below in conjunction with FIG. 8); and a OAM flag indicating whether a "collision resolution" subframe 80 or an "OAM subframe" 82 is about to follow.

In particular, in the second DVB slot pair of frame 70, control byte CTL0 includes a third (one bit) frame flag, F2, and seven bits MAC payload data; control byte CTL1 includes a fourth one bit) frame flag, F3, a seven bits MAC payload data; and control byte CTL2 includes eight bits MAC payload data, respectively. The collective twenty-two bits MAC payload data of the second DVB slot pair are used to carry either a twenty-one bit "collision resolution" subframe 80 (with one bit spare), which is discussed below, or alternately, a two byte "OAM subframe" 82 (with six bits spare), for transporting OAM data from the headend facility 22 to respective NT locations 26.

Figure 6:
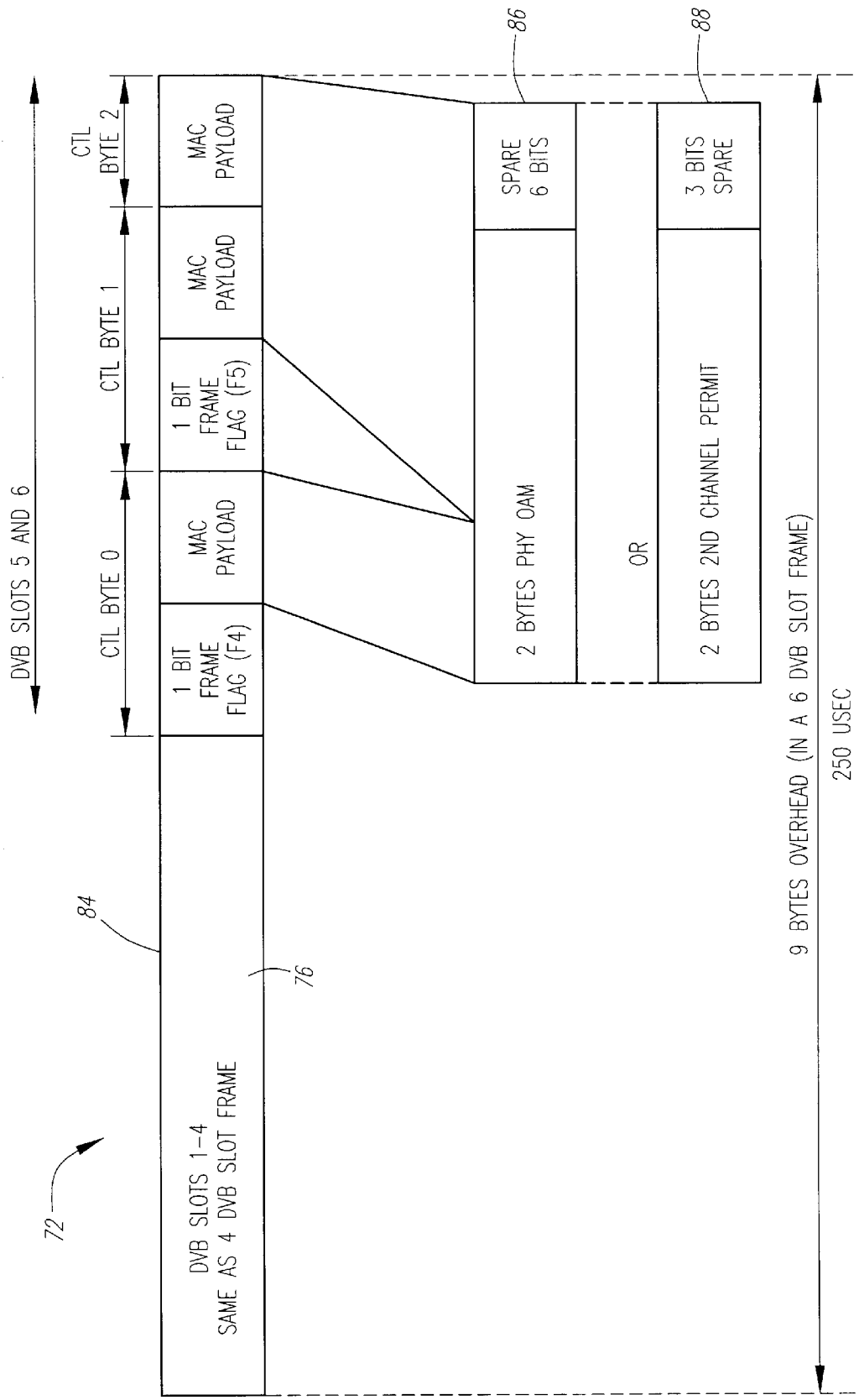
FIG. 6 is a block diagram of a preferred MAC control byte allocation in a six DVB framing slot downstream data frame.

Referring to FIG. 6, a six DVB slot downstream frame 72 is also depicted without the sync, ATM cell and FEC bytes, respectively, wherein the collective nine control bytes of frame 72 form an "expanded" control subframe 84. In preferred embodiments, the first six control bytes (i.e., from the first four DVB slots) of the expanded control subframe 84 are allocated in the exact manner as in control subframe 76 of FIG. 5,—i.e., including a two-byte permit 50. Since only one permit 50 is issued in each downstream data frame per upstream RF subcarrier channel, for a network 20 employing only a single upstream subcarrier channel, the remaining three control bytes of subframe 84 (i.e., control bytes CTL0–2 of DVB slots "five" and "six") can be used for other purposes, such as an (additional) two byte OAM subframe 86. The final three control bytes of subframe 84 also include fifth and sixth (one bit) frame flags, F4 and F5, respectively.

Alternately, it may be desirable to expand upstream network capacity by utilizing an additional RF subcarrier channel for upstream frame transmission—i.e., wherein a first set of NTs 26 is associated with a first upstream RF subcarrier channel and a second set of NTs 26 is associated with a second upstream RF subcarrier channel, respectively. In this case, the final three control bytes of the expanded control subframe 84 are used to transmit a second two byte RF subcarrier channel permit 88 (plus 6 bits spare), wherein the second channel permit 88 includes a four bit "permit type" field and a twelve bit "permit ID" field (not shown), respectively.

Figure 7:
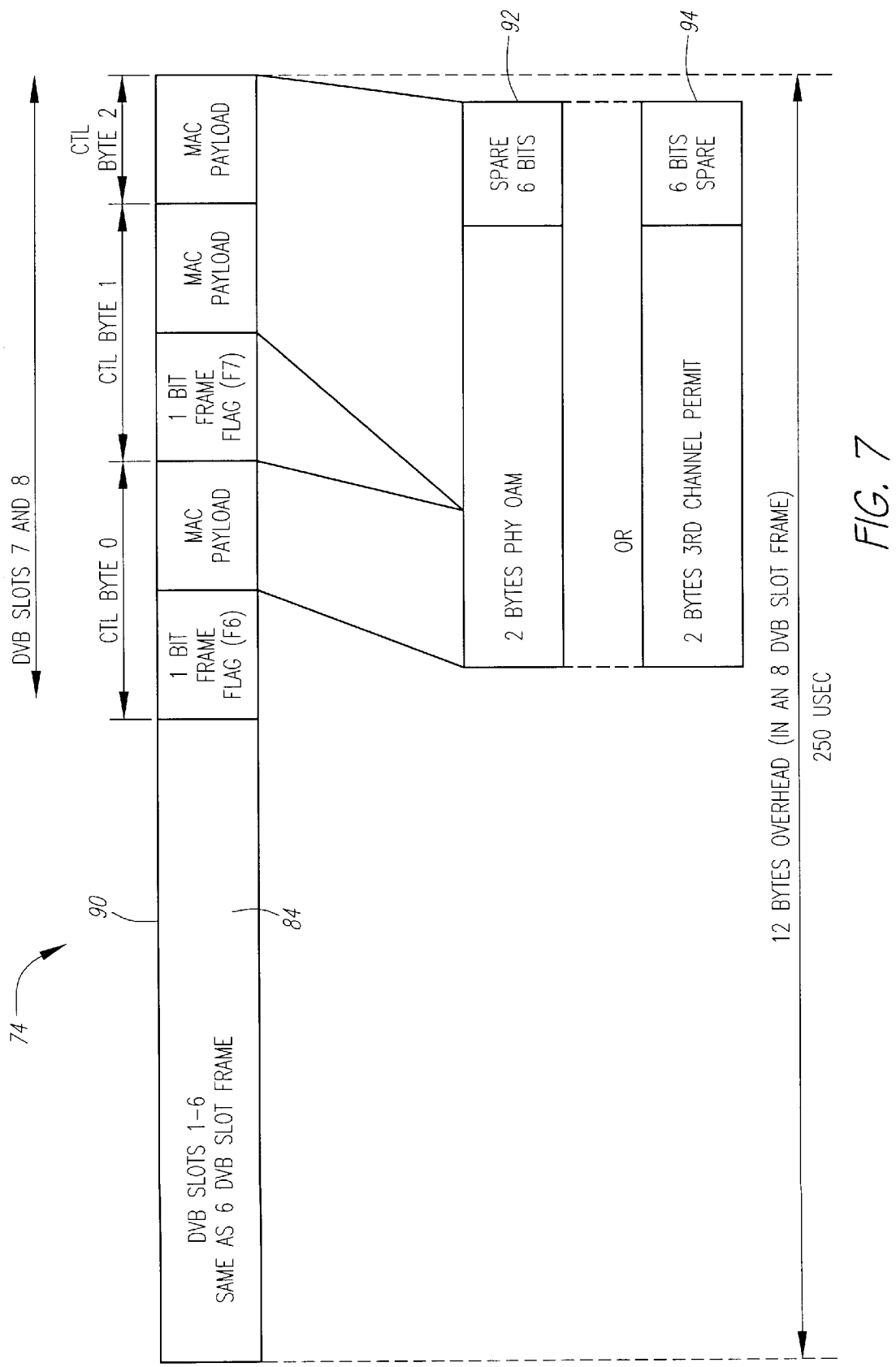
FIG. 7 is a block diagram of a preferred MAC control byte allocation in an eight DVB framing slot downstream data frame.

Referring to FIG. 7, capacity for yet another upstream subcarrier channel is provided by an eight DVB slot downstream frame 74, wherein the collective twelve control bytes of frame 72 form a "further expanded" control subframe 90. In preferred embodiments, the first nine control bytes (i.e., from the first six DVB slots) of the further expanded control subframe 90 are allocated in the exact manner as in the expanded control subframe 84 of FIG. 6,—i.e., including a two-byte first channel permit 50 and either an (additional) OAM subframe 86 or a two byte second channel permit 88, respectively. The remaining three control bytes (i.e., control bytes CTL0–2 of DVB slots "seven" and "eight"), are used to transmit yet another two byte OAM subframe 92, or a third two byte RF subcarrier channel permit 94, wherein the final three control bytes of subframe 90 also include seventh and eighth (one bit) frame flags, F6 and F7, respectively.

Figure 8:
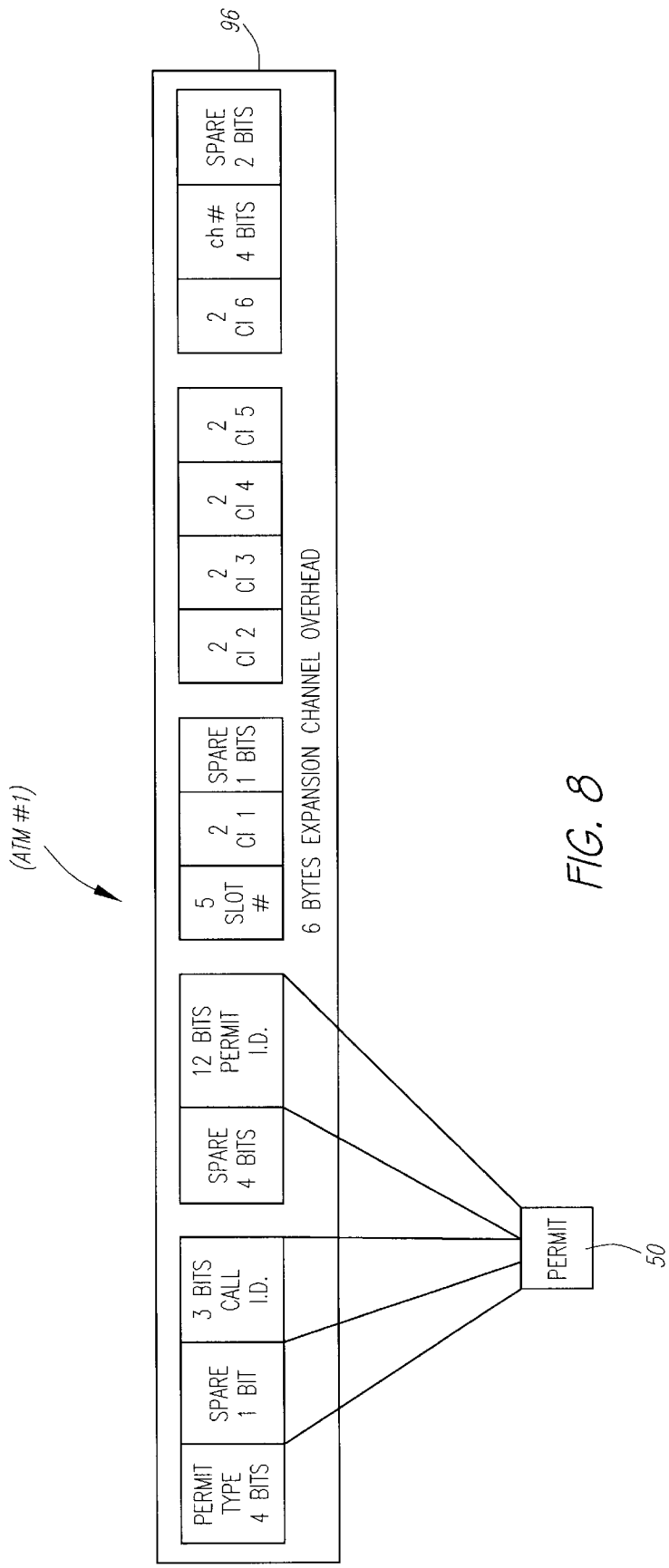
FIG. 8 is a block diagram of preferred MAC control byte allocation in a six byte ATM expansion channel.

Referring to FIG. 8, if yet additional upstream subcarrier channels need to be controlled or, conversely, when the selected downstream modulation rate cannot support the required overhead per frame for providing two byte permits for a first upstream transmission channel, such as the case in a two DVB slot frame 68, the MAC control information field preferably expands into the space occupied by the first six bytes of the first ATM cell (i.e., ATM cell #1 in DVB slot "one") of the respective downstream frame. This six byte ATM "expansion channel" 96 is preferably allocated in a similar manner as the six byte control subframe 76 depicted in FIG. 5, except that no framing bits or "acknowledge flags" are needed.

The use of an ATM expansion channel 96 is preferably indicated by an acknowledgement flag in the MAC overhead bits 78 (See FIG. 5) of the first two DVB slots of a downstream frame, so that all preferred downstream frames can use the same indicator.

Figure 9:
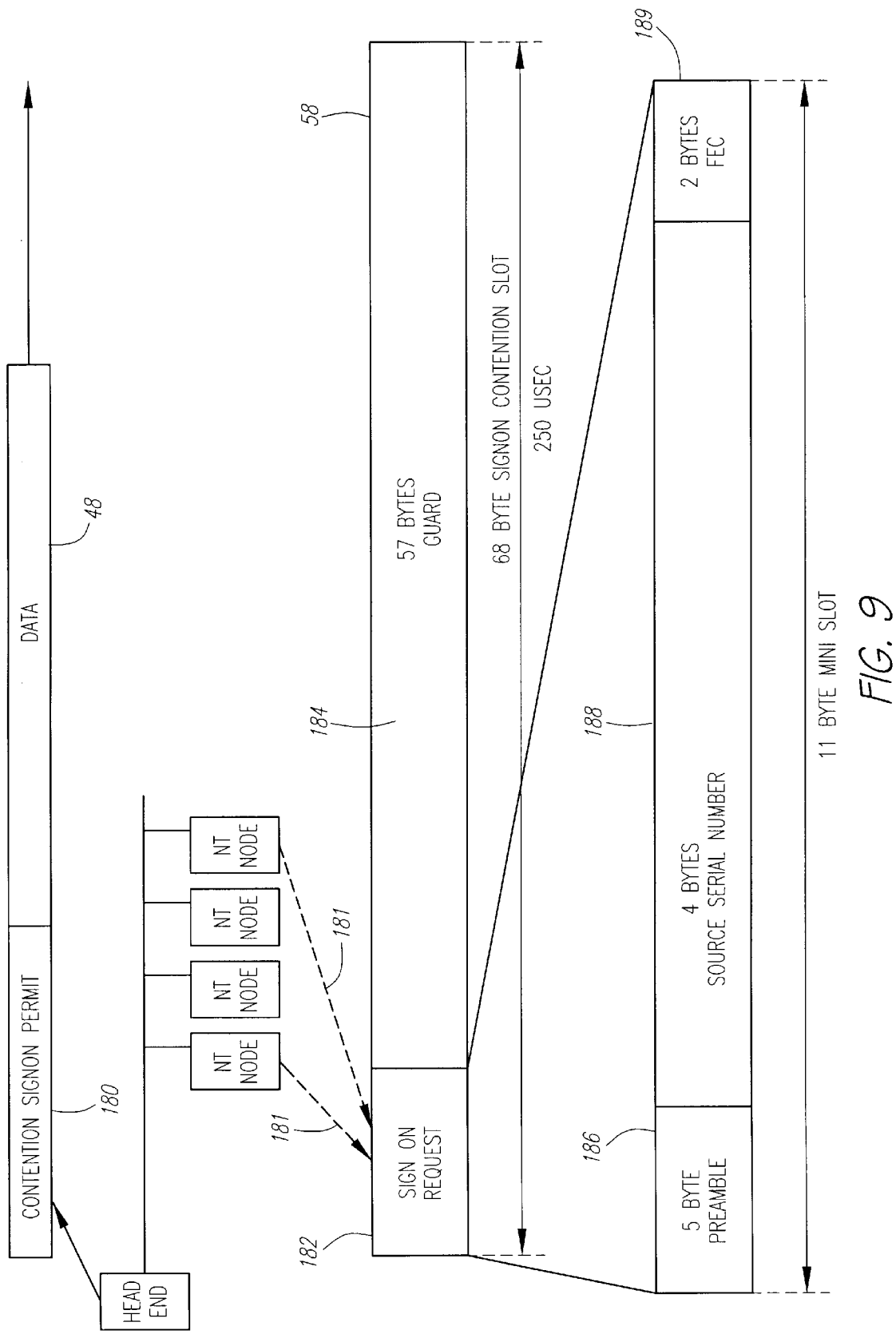
FIG. 9 is a block diagram of a preferred upstream data frame transmitted in response to a contention sign-on permit.

Referring to FIG. 9, in order to determine if any new NTs 26 have been activated, the HEMAC 28 periodically transmits a contention mode signon permit 180 for each active upstream subcarrier channel. By way of a selected "permit type" field, any newly activated NT 26 will recognize that this permit is a contention signon permit 180 and attempt an upstream response thereto. As indicated by the dashed lines 181 in FIG. 9, any NT 26 can respond to a contention signon permit as it is a "contention" mode based permit. However, preferably only those newly activated NTs 26, i.e., whose signon has not yet been acknowledged by the HEMAC 28, will attempt a response to a signon permit 180.

In particular, a NT 26 responding to a signon permit 180 transmits an eleven byte "signon request " 182, followed by fifty seven bytes of guard (i.e., "blank") space 184 to complete a 68 byte upstream timing frame. The signon request 186 preferably includes a five byte preamble 186, a four byte NT serial number, and two bytes FEC information 189, respectively. A preamble 186 is preferred to ensure the HEMAC 28 can accurately receive and read the upstream signon request 182. Because there was no previously established synchronization between the headend and the respective NT 26, the guard time 184 is preferred to help ensure the signon request 182 does not interfere with an ensuing upstream data frame 48 transmitted by another NT. For this reason, no upstream "payload cell" is transmitted with the signon request 182.

The HEMAC 28 sends an acknowledgement to the respective NT 26 upon receiving the signon request 182, i.e., in a selected acknowledgement flag field in a respective downstream control subframe (See FIGS. 5–7). In the case where two or more NTs 26 transmit an upstream signon request 182 in response to the same downstream signon permit 180, the HEMAC will send a collision indicator, instead of an acknowledgement, indicating that no signon attempt by any NT was effective.

Figure 10:
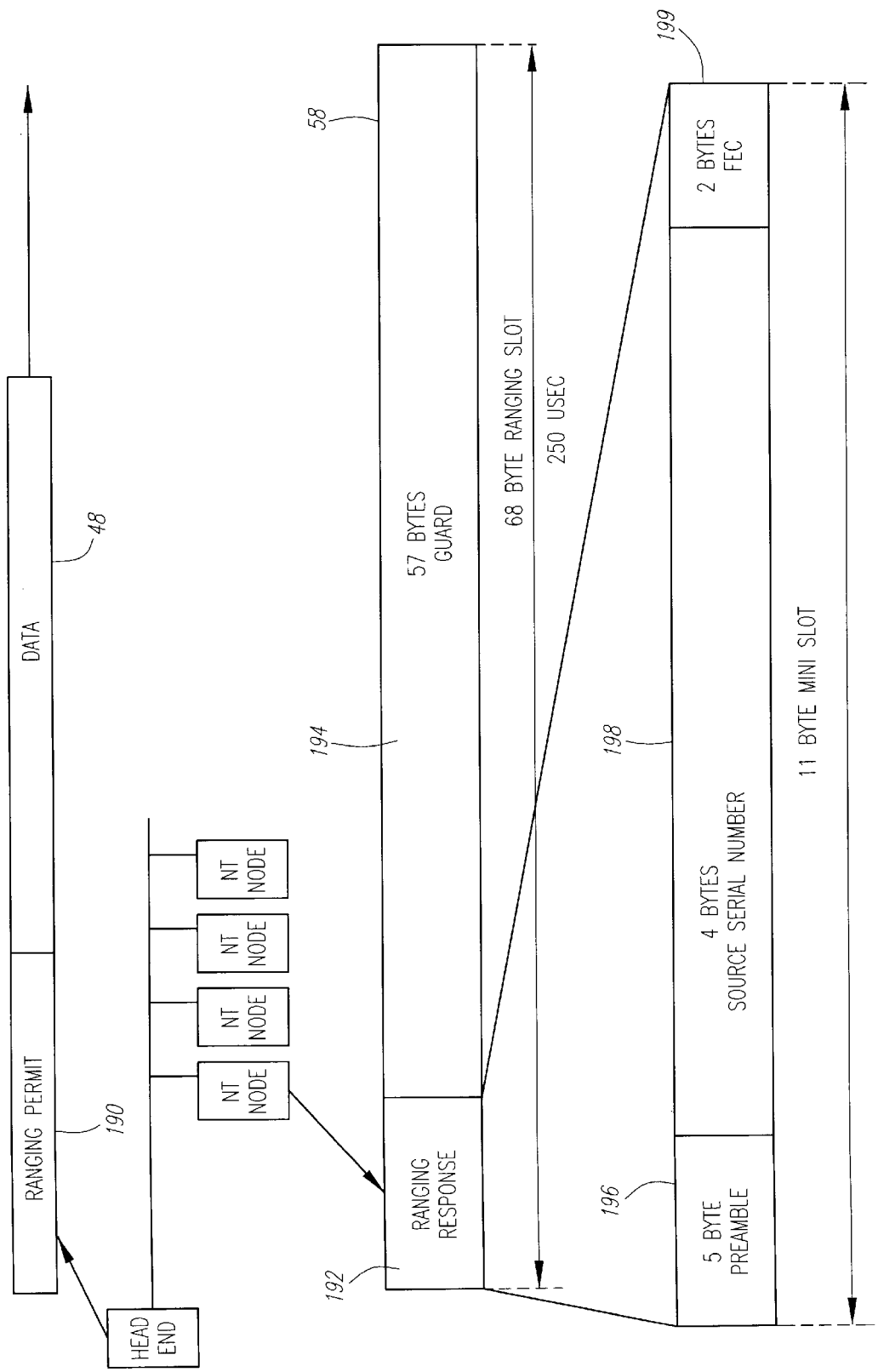
FIG. 10 is a block diagram of a preferred upstream data frame transmitted in response to a ranging permit.

Referring to FIG. 10, where an NT 26 does successfully submit a signon request 182 to the HEMAC 28, the HEMAC 28 sends a ranging permit 190 in order to determine (and subsequently adjust) the round trip transmission interval between the HEMAC 28 and respective NT 26. A ranging permit 190 is similar to a signon permit 180, in that the HEMAC 28 does not know when it will receive the upstream response from the NT 26. However, a ranging permit 190 is addressed only to a specific NT 26, thus, there is no contention situation.

To respond to a ranging permit 190, a respective NT 26 transmits an eleven byte "ranging response" 192 and fifty seven bytes of guard (i.e., "blank") 184. The ranging response 192 preferably includes a five byte preamble 196, the four byte NT serial number for the respective NT 26, and two bytes FEC information 199, respectively.

Figure 11:
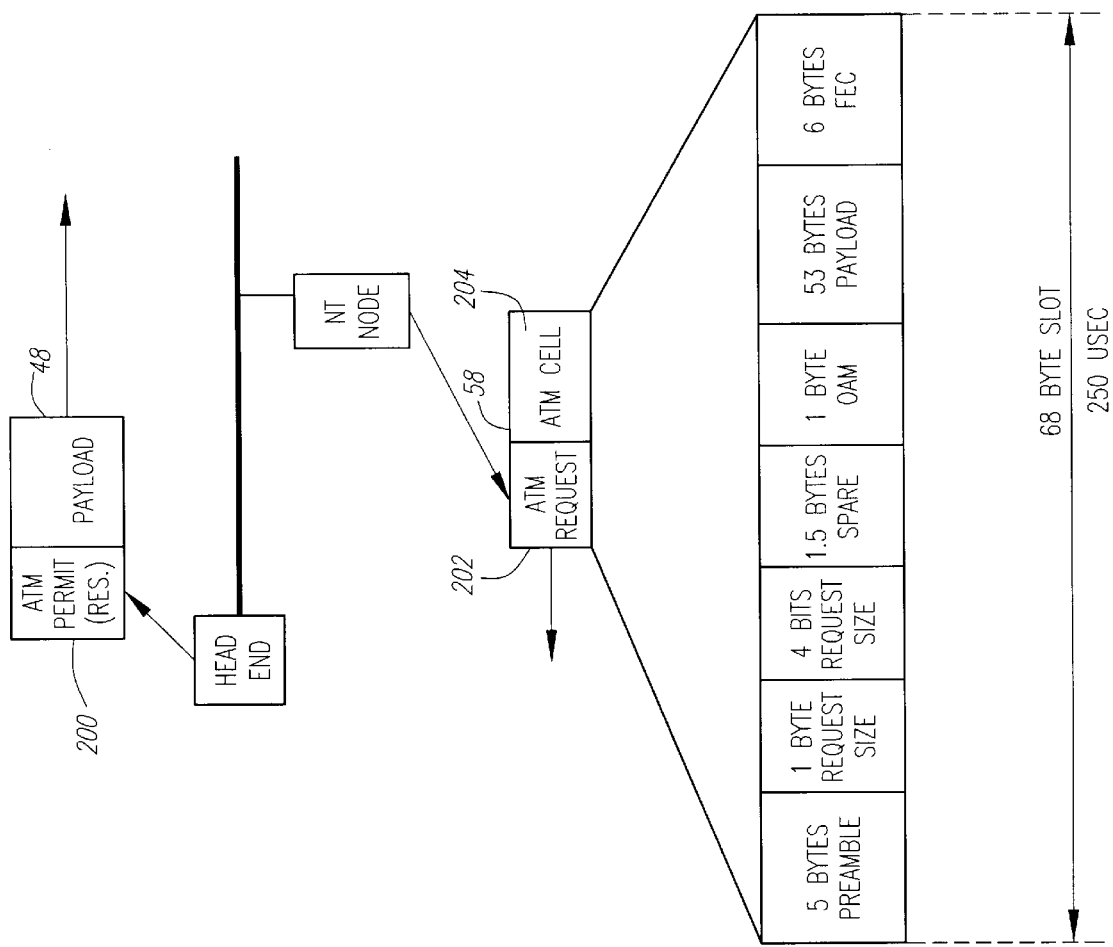
FIG. 11 is a block diagram of a preferred upstream data frame transmitted in response to an reservation mode ATM permit.

Referring to FIG. 11, the HEMAC 28 will also periodically transmit a reservation mode ATM permit 200, which allows for the upstream transmission of an ATM cell by the specified NT 26. In particular, the specified NT 26 responds to the ATM permit by transmitting an upstream data frame containing an eleven byte ATM request 202 and a fifty-three byte ATM payload cell 204. The ATM request 202 includes a five byte preamble, a one byte "request size", field, a four bit request type field, one byte OAM data, twelve bits "spare," and six bytes FEC information, respectively, wherein the FEC information applies to both the request 202 and ATM cell 204.

Figure 12:
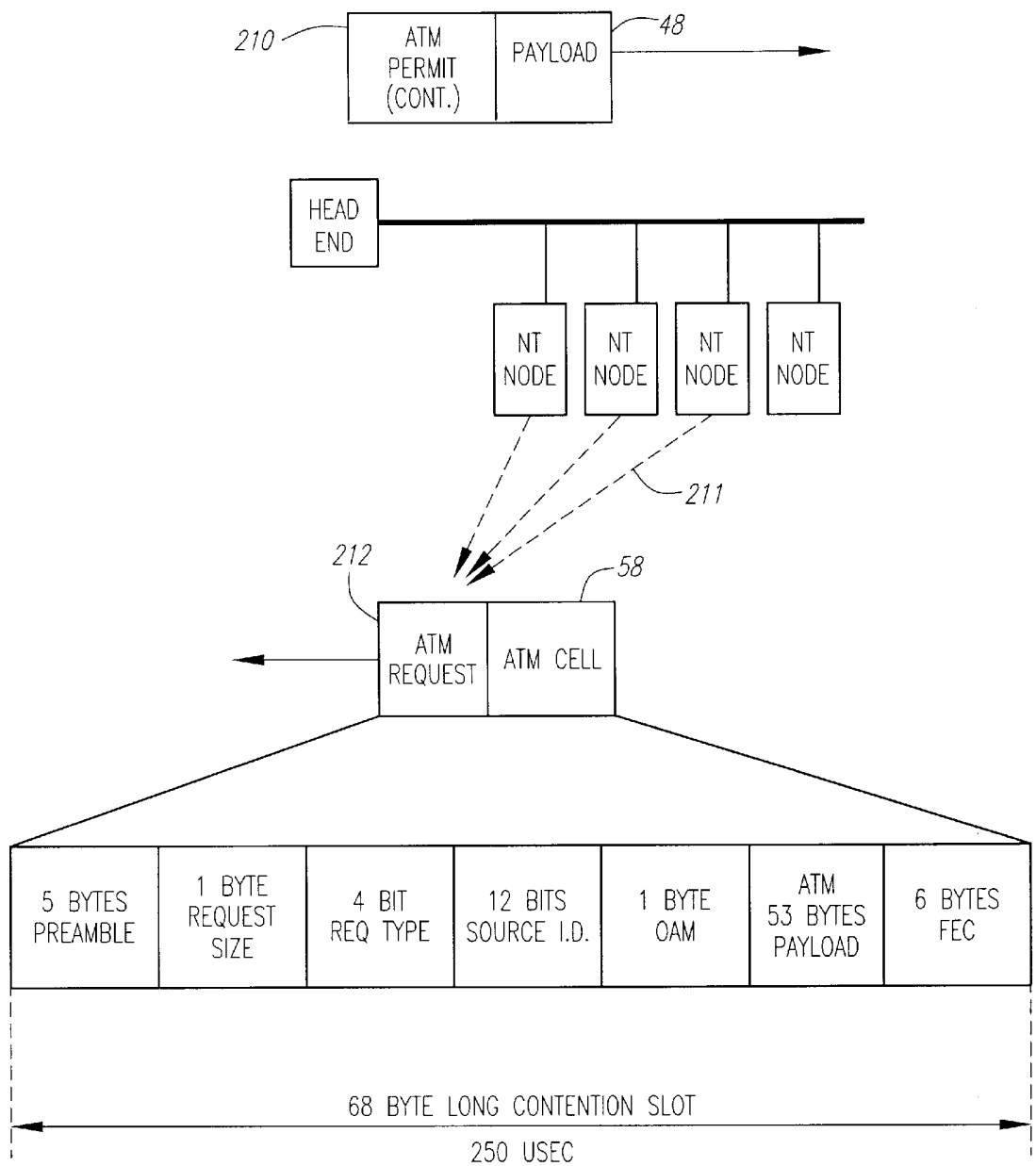
FIG. 12 is a block diagram of a preferred upstream data frame transmitted in response to a contention mode ATM permit.

Referring to FIG. 12, the HEMAC 28 may also periodically transmit a contention mode ATM permit 210, which also allows for the upstream transmission of an ATM cell, but is contention based, so that any NT 26 may respond (as indicated by dashed lines 211 in FIG. 12). A responding request 212 to a contention based ATM permit 210 is the same as responding request 202 (i.e., to a reserved ATM permit 200), except that the twelve "spare" bits are assigned as a "source I.D."e.g., MAC address) field in order to identify the sending NT 26.

If successful, the HEMAC 28 sends an acknowledgement to the respective NT 26 upon receiving the ATM request 212. In the case where two or more NTs 26 transmit an upstream ATM request 212 in response to the same downstream contention ATM permit 210, the HEMAC will send a collision indicator instead of an acknowledgement, indicating that no ATM cell transmission took place, and that the respective NTs 26 must attempt the transmission again.

Figure 13:
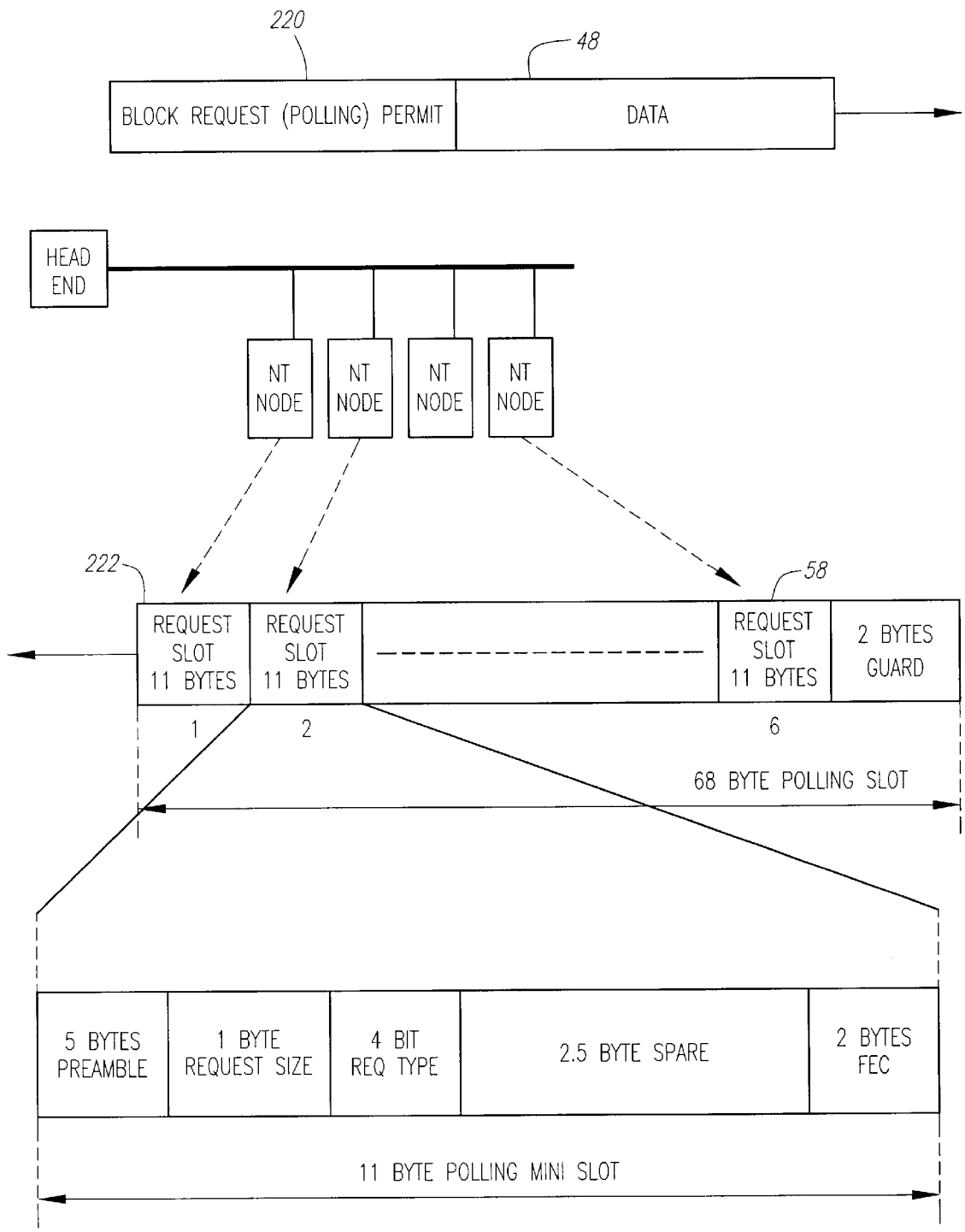
FIG. 13 is a block diagram of a preferred upstream data frame transmitted in response to a block request polling permit.

Referring to FIG. 13, in order to accommodate a greater number of upstream communication requests, the HEMAC 28 may periodically transmit a "block request" polling permit 220, which polls up to six different NTs 26 to allow for each to send an upstream request in a respective eleven byte reserved request slots 222. Each eleven byte reserved request slot 222 includes a five byte preamble, one byte "request size" field, a four bit "request type" field, two and one-half bytes spare and two bytes FEC information, respectively. In order to accommodate as many NT contention request slots 222 as possible, preferably no upstream data is transmitted.

Figure 14:
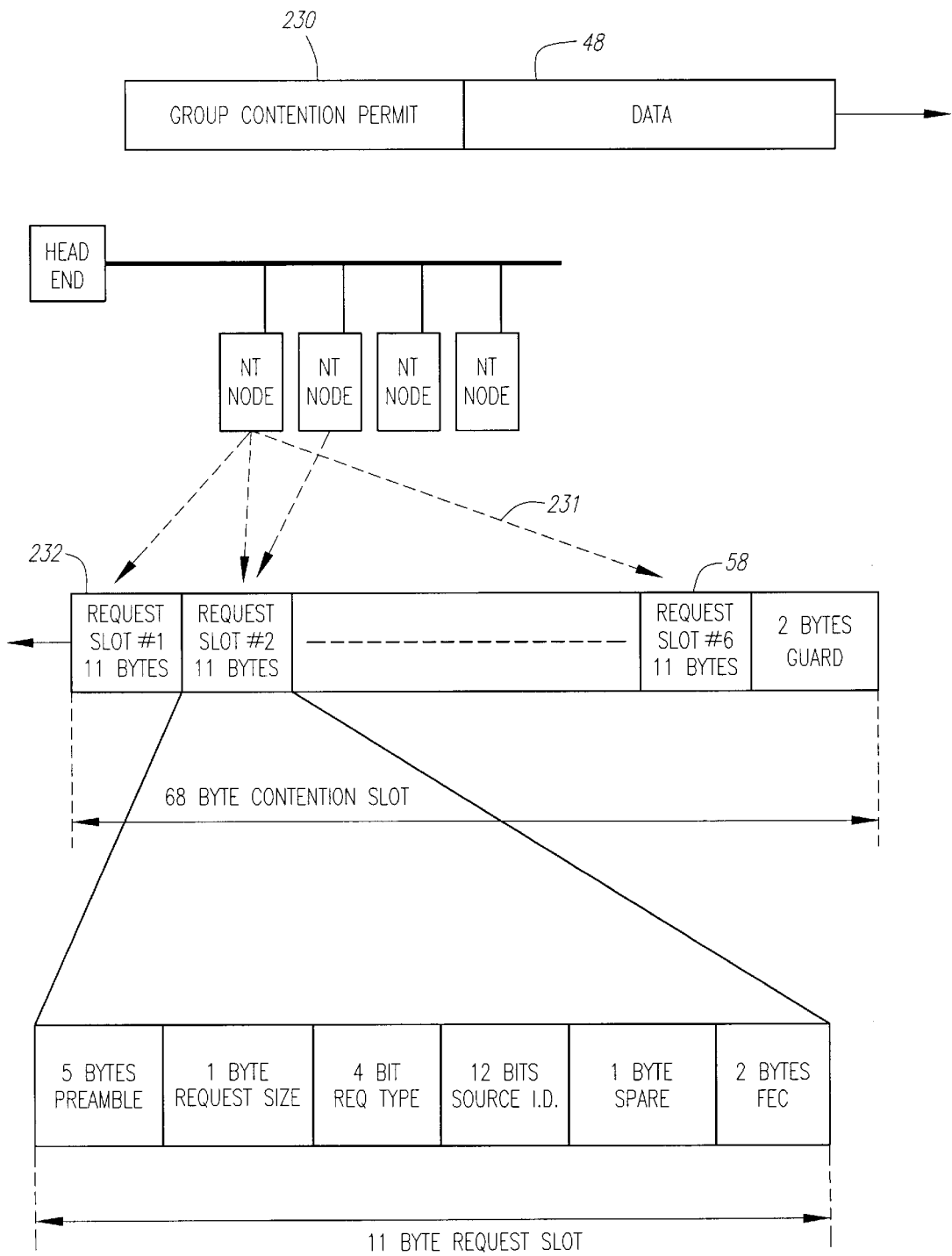
FIG. 14 is a block diagram of a preferred upstream data frame transmitted in response to a group contention permit.

Referring to FIG. 14, in order to accommodate a greater number of upstream communication requests without having to poll each NT 26, the HEMAC 28 may also periodically transmit a "group contention permit" 230, which allows up to six different NTs to send upstream requests in respective eleven byte contention request slots 232. Although each NT 26 is allowed to contend for any of the six respective contention request slots 232, as indicated by the dashed line 231 in FIG. 14, it may only contend for a single contention request slot 232 per group permit 230. Each eleven byte contention request slot 232 includes a five byte preamble, one byte "request size" field, a four bit "request type" field, twelve bits "source ID" field (e.g., for the transmitting NT's MAC address), one spare byte and two bytes FEC information, respectively. Again, in order to accommodate as many NT contention request slots 232 as possible, preferably no upstream data is transmitted.

Block request permits 220 or group contention permits 230 are preferably issued by the HEMAC 28 during idle or low network traffic conditions, to ensure that no NT 26 requiring upstream bandwidth is forced to stand idle. Block request permits 220 or group contention permits 230 are also preferably issued by the HEMAC 28 on a regularly scheduled basis, e.g., at a selected interval, to better ensure upstream transmission access to all NTs.

Contention mode permits 210 and 230 are preferably used only by an NT 26 requesting an upstream bandwidth channel when initiating a new upstream communication path or connection slot. Once granted an upstream slot or cell by the HEMAC 28, further bandwidth requests are made by the respective NT 26 in the "request" overhead of its designated upstream slots, i.e., in response to reservation mode or scheduled mode permits only.

Referring back to FIG. 5, the twenty-one bit "contention acknowledgement" subframe 80 is used to indicate the results of the upstream requests 232 in response to a respective group contention permit 230. The subframe 80 is transmitted by the HEMAC 28 in an ensuing downstream frame 48, so that the respective NTs 26 that submitted a request can verify whether their request was successful, or whether they must make another attempt. The subframe preferably includes a five bit permit slot ID field, six respective two bit collision indicator fields, and a four bit subcarrier channel ID, respectively.

In the case of collisions between NTs 26 vying for the same upstream request slot 232, the contention is preferably resolved using one of the known efficient contention resolution Random Access algorithms (RAA) such as a Ternary Tree binary feedback (TTBF) algorithm. Such an algorithm is tailored to systems with a large number of stations and outperforms ALOHA algorithms without suffering from its stability problems. An overview of known contention resolution algorithms is provided in a paper presented to the IEEE Project 802.14 Working Group entitled, "A review of Random Access Algorithms", by Chatschik Bisdikian of IBM, dated January 1996, which is fully incorporated herein by reference.

Figure 15:
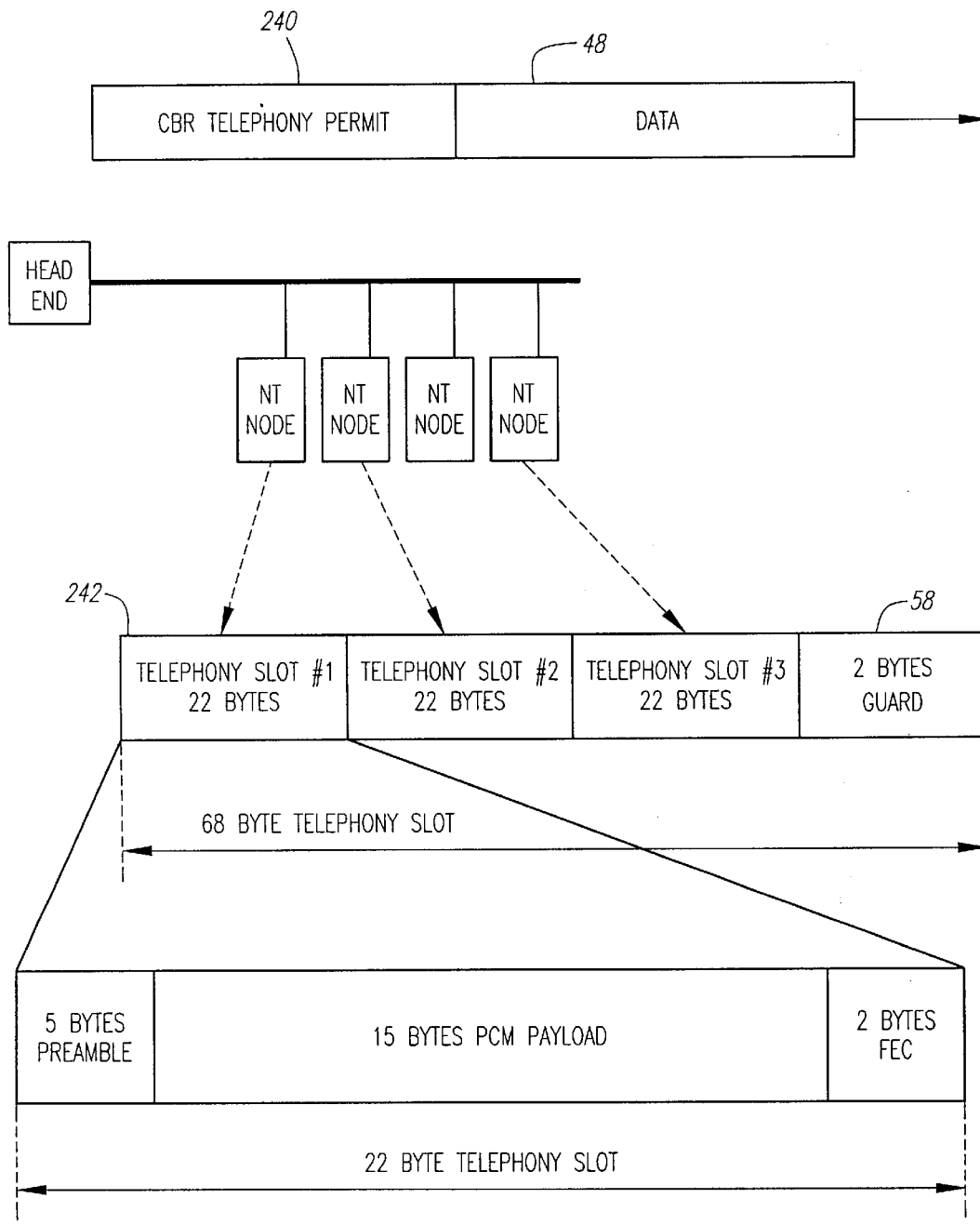
FIG. 15 is a block diagram of a preferred upstream data frame transmitted in response to a CBR telephony permit.

Referring to FIG. 15, upon receipt of a respective upstream request, i.e., in response a contention or polling permit, the HEMAC 28 will issue scheduled mode permits, such as CBR telephony permits 240, to provide dedicated upstream certain low-delay for certain low-delay services. Each CBR telephony permit 240 allows up to three previously assigned NTs 26 to send a twenty-two byte upstream telephony slot 242 to the HEMAC 28 for processing. Each telephony slot 242 contains a five byte preamble, fifteen bytes of telephony data, and two bytes FEC. When the dedicated upstream CBR bandwidth is no longer needed by the respective NT 26, (e.g., upon completion of a telephone call), it sends a "stop" request to the HEMAC 28, e.g., in the "request type" field of any available upstream request slot.

In alternate preferred embodiments, synchronized telephony services may be supported efficiently by provisioning "semi-permanent" portions of the upstream bandwidth for telephony ATM without suffering from its stability problems. An overview of known contention resolution algorithms is provided in a paper presented to the IEEE Project 802.14 Working Group entitled, "A review of Random Access Algorithms", by Chatschik Bisdikian of IBM, dated January 1996, which is fully incorporated herein by reference.

Referring to FIG. 15, upon receipt of a respective upstream request, i.e., in response a contention or polling permit, the HEMAC 28 will issue scheduled mode permits, such as CER telephony permits 240, to provide dedicated upstream bandwidth required for certain low-delay services. Each CBR telephony permit 240 allows up to three previously assigned NTs 26 to send a twenty-two byte upstream telephony slot 242 to the HEMAC 28 for processing. Each telephony slot 242 contains a five byte preamble, fifteen bytes of telephony data, and two bytes FEC. When the dedicated upstream CBR bandwidth is no longer needed by the respective NT 26, (e.g., upon completion of a telephone call), it sends a "stop" request to the HEMAC 28, e.g., in the "request type" field of any available upstream request slot.

In alternate preferred embodiments, synchronized telephony services may be supported efficiently by provisioning "semi-permanent" portions of the upstream bandwidth for telephony ATM channels, which can be allocated among selected NTs 26, depending on the particular service configuration.

Downstream partitioning for CBR telephony cells (i.e., in scheduled mode) is preferably allocated by the HEMAC so that the 22 byte upstream telephony slots 242 are received at the headend 22 at intervals of 5.875 msecs. Referring to FIG. 17, this may be accomplished, by employing a CBR permit 240 scheduler 120 in the HEMAC 28, which evenly allocates the CBR telepohony permits based on a repetitive rotation of 47 downstream frames. For example at a slot 02, a permit is allocated for NT#0520, Call ID 1. At slot 25, i.e., after 5.75 msec, the next successive permit is issued for the same NT and call ID. Because the permit scheduler 120 is looped, the next permit for this same NT and Call ID will occur again at slot 02 of the ensuing loop, i.e., after 6.0 msec. By repeating this loop, the CBR telephony permits are issued at an average of 5.875 msec.

While embodiments and applications of this invention have been shown and described, as would be apparent to those skilled in the art, many more modifications and applications are possible without departing from the inventive concepts herein. The scope of the disclosed inventions, therefore, are not to be restricted except in the spirit of the appended claims.

What is claimed:

1. A communication network, comprising:
   a headend; and
   a plurality of network terminals connected to the headend by a shared communication medium, wherein the headend transmits successive DVB compatible downstream data frames over the shared communication medium, each downstream data frame including a bandwidth permit associated with a first upstream RF carrier channel ("first channel permit"),
   wherein the downstream data frames each comprise one or more pairs of DVB slots each DVB slot pair comprising a plurality of ATM data cells and also comprising MAC control data.

2. The communication network of claim 1, wherein a first ATM cell comprises an expansion MAC channel, the expansion channel including the first channel permit.

3. The communication network of claim 2, wherein the expansion MAC channel further comprises collision indicator information.

4. The communication network of claim 1, wherein downstream data frames are serially transmitted by the headend in successive 250 usec intervals.

5. The communication network of claim 1, wherein each downstream data frame comprises two pairs of DVB slots, the two pairs of DVB slots collectively comprising a first plurality of MAC control bytes.

6. The communication network of claim 5, wherein the first plurality of MAC control bytes include the first channel permit, the first channel permit having a permit type field, a call ID field and a permit ID field.

7. The communication network of claim 6, wherein the plurality of MAC control bytes alternately further comprise a first OAM data field or a collision indicator data field.

8. The communication network of claim 7, wherein each downstream data frame further comprises a third pair of DVB slots which collectively comprise a second plurality of MAC control bytes, the second plurality of MAC control bytes alternately comprising a second OAM data field or a bandwidth permit associated with a second upstream RF carrier channel ("second channel permit"), the second channel permit includes a permit type field, a call ID field and a permit ID field.

9. The communication network of claim 8, wherein each downstream data frame further comprises a fourth pair of DVB slots which collectively comprise a third plurality of MAC control bytes, the third plurality of MAC control bytes alternately comprising a third OAM data field or a bandwidth permit associated with a third upstream RF carrier channel ("third channel permit"), the third channel permit including a permit type field, a call ID field and a permit ID field.

10. The communication network of claim 1, wherein one or more of the network terminals periodically transmits upstream data over the shared medium, each upstream data transmission including a response from the respective network terminal to a received upstream bandwidth permit.

11. The communication network of claim 10, wherein a respective network terminal response periodically comprises a request for further upstream communication bandwidth over a selected RF carrier channel.

12. The communication network of claim 10, wherein upstream data transmissions from one or more network terminals form successive upstream data frames received by the headend.

13. The communication network of claim 10, wherein upstream data frames are received serially by the headend in successive 250 usec intervals.

14. A communication network, comprising:

a headend;

a shared communication medium;

a plurality of network terminals connected to the headend by the shared communication medium, wherein DVB compatible downstream data frames are serially transmitted by the headend over the shared communication medium every 250 usec, each downstream data frame comprising two or more pairs of DVB slots, each DVB slot pair comprising a plurality of ATM data cells and also comprising MAC control data, the collective MAC control data of each downstream data frame carrying at least one upstream bandwidth permit.

15. The communication network of claim 14, wherein one or more of the network terminals periodically transmits upstream data over the shared medium, with upstream data transmissions from one or more network terminals form successive upstream data frames received by the headend.

16. The communication network of claim 15, wherein upstream data frames are received serially by the headend in successive 250 usec intervals.

17. The communication network of claim 14 wherein the shared communication comprises a coaxial distribution network.

18. The communication network of claim 14, wherein a first ATM cell comprises an expansion MAC channel, the expansion channel including an upstream bandwidth permit.

19. A communication network, comprising:

a headend;

a shared communication medium;

a plurality of network terminals connected to the headend by the shared communication medium, wherein downstream data frames are serially transmitted by the headend over the shared communication medium every 250 usec, each downstream data frame comprising two or more pairs of 204 byte DVB slots, each DVB slot pair comprising a plurality of 53 byte ATM data cells and also comprising MAC control data, the collective MAC control data of each downstream data frame carrying at least one upstream bandwidth permit, and wherein one or more of the network terminals periodically transmits upstream data over the shared medium, with upstream data transmissions from one or more network terminals form successive 68 byte upstream data frames serially received by the headend every 250 usec.

* * * * *